Sept. 19, 1961     J. L. JENSEN     3,001,125
ELECTRICAL APPARATUS

Filed Nov. 28, 1958     2 Sheets-Sheet 1

INVENTOR.
JAMES LEE JENSEN

BY Osmund R. Dahle

ATTORNEY

INVENTOR.
JAMES LEE JENSEN

BY *Omund R. Dahle*

ATTORNEY

United States Patent Office 3,001,125
Patented Sept. 19, 1961

3,001,125
ELECTRICAL APPARATUS
James Lee Jensen, St. Louis Park, Minn., assignor to Minneapolis-Honeywell Regulator Company, Minneapolis, Minn., a corporation of Delaware
Filed Nov. 28, 1958, Ser. No. 776,818
12 Claims. (Cl. 323—66)

The present invention is concerned with an improved power supply for a photographic flash unit and more particularly with an improved electronic circuit for efficiently converting a low voltage D.C. potential to a high voltage D.C. potential to charge the high voltage capacitor.

As is known in the art, the electronic type photographic flash unit utilizes a gas filled flash tube which is capable of emitting a brilliant flash of light when a high voltage capacitor is discharged through the flash tube. These flash units are powered either from an A.C. or a D.C. source. The A.C. type of flash unit is provided with an extension cord which connects with a source of alternating voltage, such as is available in a residence or in a photographic studio. This alternating voltage is stepped up to a high A.C. voltage by means of a step up transformer and is then rectified to charge a capacitor, which capacitor is then selectively discharged through the gas filled flash tube to produce the flash of light.

The D.C. type electronic photographic flash unit may take one of two forms. The first of these forms involves a heavy, expensive, high voltage battery, for example, a dry cell having a voltage of 450 volts. The high voltage battery charges the capacitor which is then selectively discharged through the flash tube. The second form of D.C. type electronic photographic flash unit utilizes a plurality of light weight, inexpensive, low voltage batteries, commonly called flashlight batteries. These particularly may be of the type especially adapted for photographic use or may be rechargeable type cells. With this type of unit, a vibrator is provided to convert the low D.C. voltage of the battery to a low voltage A.C. or pulsating D.C. The low voltage A.C. is applied to a step up transformer to produce a high A.C. voltage. This high A.C. voltage is then rectified and the high D.C. voltage charges the capacitor which is connected to the flash tube, and is adapted to be discharged through the flash tube to produce the brilliant flash of light.

It will be readily appreciated that it is only the two above described D.C. type flash units which are adapted to be readily used in any situation. This is not true of the A.C. type units since the A.C. units require an extension cord connecting the unit to a source of alternating voltage, thereby limiting the locations in which the A.C. unit may be utilized.

Prior art D.C. electronic type photographic flash units of the second type, in which the power supply includes a low voltage battery source, D.C. to A.C. converter, a step up transformer, a rectifier, and a capacitor to be charged, have had the undesirable feature of relatively short battery life. One of the requirements of good electronic type photoflash units is in having a relatively fast recycle rate, or in other words, after the flash unit is fired it is desirable to be able to recharge the capacitor rapidly. This results in a heavy current drain from the low voltage cells and requires a relatively heavy duty vibrator to interrupt the D.C. current. The standby power requirements to operate the vibrator itself are substantial and continuous, whether the capacitor is being charged or is fully charged. This is true since it is not feasible to turn off the vibrator after the capacitor is charged and prior to the time the flash tube is fired.

The present invention on the other hand, provides an improved power supply for a D.C. electronic type photographic flash unit of the second type which includes an improved single transistor electronic oscillator type current inverter or vibrator. The on-time off-time or reset time ratio of the oscillator inverter is controlled as a function of the capacitor voltage so that as the capacitor becomes charged to a given voltage, the ratio of the on-time to off-time of the oscillator is reduced. As a result, the standby current drain from the low voltage battery source is minimized when the capacitor is charged and thus battery life is extended.

Although the improved power supply circuit is particularly adapted for use in photographic flash units as described above, the invention is not intended to be limited to use in the photographic field.

It is an object of this invention to provide an improved low voltage D.C. to high voltage D.C. power supply for a D.C. electronic type photographic flash unit.

It is a more specific object of this invention to provide an improved low voltage D.C. to high voltage D.C. power supply for charging a high voltage capacitor of a D.C. electronic type photographic flash unit, in which the single transistor electronic converter operation is modified as a function of the charge on the capacitor to reduce to a minimum current drain from the low voltage battery source during periods when the capacitor is charged.

These and other objects of the present invention will be more clearly understood upon consideration of the claims, specification and drawings of which:

Figure 1:
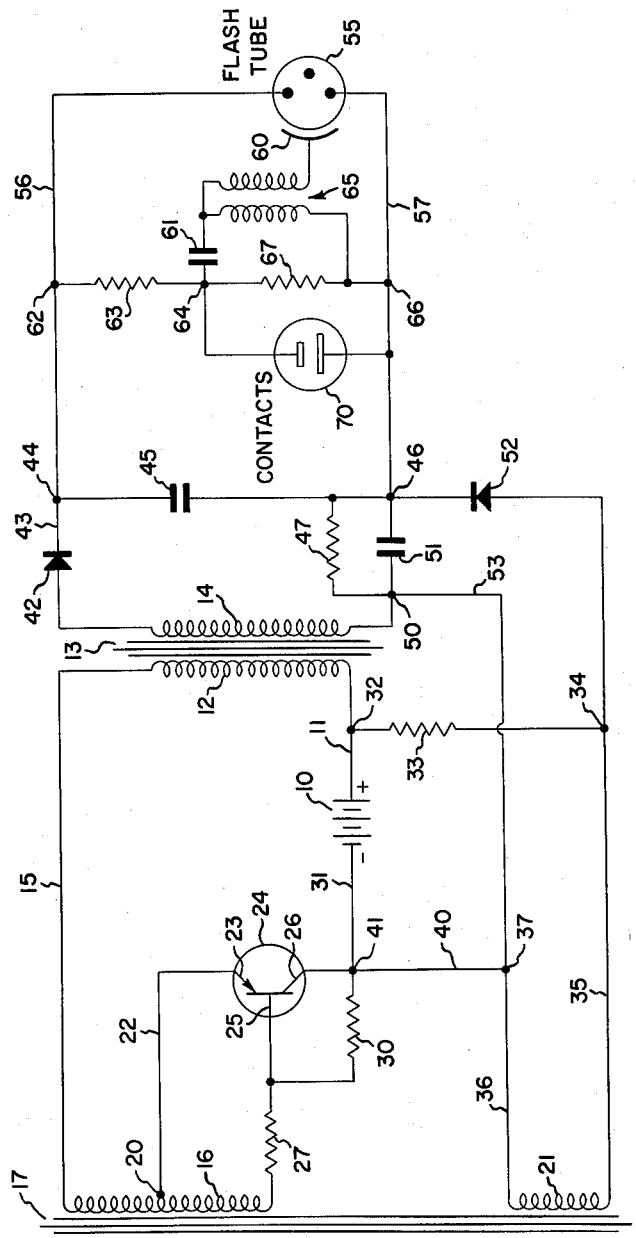
FIGURE 1 is a schematic representation of an embodiment of my invention.

Referring now to the drawing, wherein like parts are indicated by like reference numerals throughout the figures, and referring particularly to FIGURE 1, there is shown a low voltage source of D.C. potential 10, which may be for example a plurality of D cells, commonly known as flashlight batteries. The positive terminal of the source 10 is connected by a conductor 11 to the lower extremity of a primary winding 12 of a step up transformer 13. The step up transformer 13 also includes a high voltage secondary winding 14. The upper extremity of winding 12 is connected by means of a conductor 15 to the upper extremity of a winding 16 of a saturable coil or transformer 17. The winding 16 includes an intermediate tap 20 and the transformer 17 also includes an additional winding 21. The intermediate tap 20 is connected by a conductor 22 to an emitter electrode 23 of a current controlling device 24, here shown as a transistor. The device 24 also includes a control electrode 25 and a collector electrode 26. A resistor 27 connects the lower extremity of the winding 16 to the control electrode 25, and a bias resistor 30 is connected between the control electrode 25 and the negative terminal of source 10. The collector electrode 26 is also connected by means of a conductor 31 to the negative terminal of the source 10.

A further circuit may be traced from the positive terminal of source 10 through the conductor 11, a junction 32, a current limiting resistor 33, a junction 34 and a conductor 35 to the lower extremity of the winding 21 of transformer 17, from the upper extremity of the winding 21 through a conductor 36, a junction 37 and a conductor 40, to a junction 41 on the conductor 31 which connects to the negative terminal on the source 10. This current path provides circuit means for controlling the resetting of the flux level of the core of saturable transformer 17.

The upper extremity of secondary winding 14 of output transformer 13 is connected through a rectifying element 42, such as a junction diode, and through a conductor 43 and a junction 44 to electrical energy storage means or variable load means 45, here shown to the positive plate of a main capacitor 45. It is well recognized in the art that a capacitor being charged presents, in effect, a variable load to the charging apparatus. The other plate of the main capacitor 45 is connected by means of a junction 46, a resistor 47 and a junction 50 to the lower extremity of the secondary winding 14. The resistor 47 is paralleled by a capacitor 51. A rectifying blocking diode 52 connects the junction 34 to the junction 46 with the direction of easy current flow being towards junction 46, and a conductor 53 connects the junction 37 to the junction 50.

A high voltage photographic flash tube 55 is a gas filled device provided with a pair of main current conducting electrodes, one of which is connected through a conductor 56 to the junction 44, and the other of which is connected through a conductor 57 to the junction 46. The flash tube 55 also includes a triggering electrode 60 which is adapted to initiate discharge of the flash tube, as will be described.

Another capacitor 61 is connected across the main capacitor 45 in a circuit which can be traced from the upper plate of capacitor 45 through junction 44, a portion of conductor 56, the junction 62, a resistor 63, a junction 64, the capacitor 61, a portion of the winding of a trigger coil or transformer 65 to a junction 66 on the conductor 57, and through junction 46 to the lower plate of main capacitor 45. The other portion of coil or transformer 65 is connected to the triggering electrode 60 of the flash tube. A resistor 67 is connected between the junction 64 and the junction 66 paralleling the capacitor 61. In addition, a pair of normally open triggering contacts 70 are connected between the junction 64 and the conductor 57. The triggering contacts may be connected to or may represent the camera shutter contacts. These components form the triggering circuit for igniting the flash tube and discharging the capacitor through the tube.

*Operation of FIGURE 1*

In considering the operation of the apparatus of FIGURE 1, the following discussion will first be directed towards the D.C. low voltage current interrupting circuit. The transistor 24, transformer 17, source 10 and the associated circuitry forms a single sided oscillator circuit to be discussed in detail below.

A current path may be traced from the positive terminal of source 10 through the primary winding 12 of the output transformer 13, through conductor 15, the upper portion of winding 16 of saturable transformer 17, from tap 20 through conductor 22 to the transistor 24, through the transistor from emitter 23 to collector 26 and back through conductor 31 to the negative terminal of the source 10. A bias current path to initiate conduction in the transistor 24 may be traced from the base electrode 25 through the resistor 30 and the junction 41 to the negative terminal of the source 10. As current flows in the upper portion of winding 16 of transformer 17 through the emitter circuit of transistor 24, a current is induced in the lower portion of the winding 16 which is effective to bias transistor to a fully conductive state thus allowing the relatively large current to flow through the transformer winding 12 and the transistor 24. This condition of operation continues until the core of transformer 17 saturates. Upon saturation of the core, the current previously induced on the lower portion of the winding 16 is reduced and the transistor turns off until the core is reset, as will be described below.

The saturable core 17 is reset by means of the circuit from the battery 10 through the winding 21, and this circuit may be traced from the positive terminal of source 10 through conductor 11 to junction 32, through the current limiting resistor 33, junction 34, conductor 35, through the winding 21 of transformer 17, conductor 36, junction 37, conductor 40, junction 41, and through conductor 31 to the negative terminal of source 10. This D.C. current path provides a reset of the core flux whereupon the transistor 24 again becomes conductive and the cycle repeats. After the core 17 saturates following the resetting period, the transistor 24 is no longer back biased between emitter 23 and base 25, and the current flowing through resistor 30 again initiates conduction in the transistor. The pulsating or interrupted D.C. resulting from the cycling of the oscillator also appears as a pulsating D.C. in the transformer winding 12 and is transformed to a high voltage A.C. by the step up transformer 13.

During the period transistor 24 is conductive and current is flowing through the primary winding 12 of transformer 13, a high voltage potential is induced in the high voltage secondary winding 14 which causes a current to flow through the rectifier 42 and which tends to charge the main capacitor 45. This current path may be traced from the uper terminal of winding 14 through the rectifier 42, conductor 43, junction 44, through the capacitor 45, junction 46, resistor 47, junction 50 and back to the lower terminal of winding 14.

During the initial stages of charging the main capacitor 45 when the potential appearing thereacross is relatively low, the charging current flowing through the capacitor 45 and the resistor 47 is relatively large and as a result thereof a relatively large potential appears across the capacitor 51 with the junction 46 being positive with respect to junction 50. Under these conditions, the blocking rectifier 52, capacitor 51 and resistor 47 have little or no limiting effect on the reset circuit of saturable transformer 17, and the resetting of the core is accomplished in a minimum time so that the duty cycle of the transistor is long compared to the reset time. The diode 52 prevents the potential on capacitor 51 from affecting the reset circuit. In this manner maximum power is handled by the converter circuit and the main capacitor 45 is charged rapidly towards the desired high voltage level.

As has been pointed out above, during the initial period of charging the main capacitor 45, the potential appearing across resistor 47 and capacitor 51 is larger than the core resetting potential appearing across the winding 21 from the source and through resistor 33, and thus there is no limiting effect on the core reset circuit and the core 17 is reset relatively quickly. It is desirable, however, that as the capacitor 45 is charged to the desired potential, that the duty cycle of the oscillator be changed from one in which transistor 21 conducts a predominate portion of the cycle to one in which the transistor conducts a relatively short portion of the oscillating cycle. Consider now the charging circuit of capacitor 45 as the capacitor nears the peak voltage for which the circuit is designed. The charging current into main capacitor 45 now reduces to a much lower value with the result that the potential appearing across the resistor 47 and the capacitor 51 is also much reduced. It will be noted that as the potential on capacitor 51 becomes sufficiently low, the circuit from junction 34 through the diode 52, the capacitor 51 and parallel resistor 47, and back to the junction 37 operates as a limiter or voltage clipper on the potential applied to the reset winding 21. Reduction in the voltage appearing across the reset winding 21 reduces the induced voltage in this winding. With a lower induced voltage, the rate of change of magnetic flux in the core of transformer 17 is reduced. As a result, the time period elapsing during core reset for a reasonably constant magnetic flux reset is increased.

Thus it can be seen that the lower becomes the charging current of the main capacitor 45, the lower will be the potential on capacitor 51 thus limiting the reset potential to a progressively lower magnitude and increasing the reset time. The change in ratio between on-time and reset-time is a result of increasing the reset period which has the effect of lowering the oscillating frequency.

This change in the oscillator duty cycle which occurs when the main capacitor is charged, is effective to reduce by a substantial amount the average power required from the D cells. In this manner the operating life of the D cells can be extended by a substantial margin.

As the main capacitor 45 is charged, a current flows through the voltage divider comprising the resistors 63 and 67. This circuit places a charge on the capacitor 61. The charging current flowing through the capacitor 61 and the first portion of the winding of coil 65 is not of a nature to cause a triggering voltage to appear on the triggering electrode 60.

When it is desired to flash the flash tube 55, the camera shutter circuit is completed by completing a circuit between the contacts 70. This circuit shunts the above mentioned portion of the coil 65 and capacitor 61 and causes the capacitor 61 to discharge through the portion of the coil 65. A high triggering voltage is induced in the remaining portion of the winding of coil 65 which is connected to the triggering electrode 60 of the flash tube 55. This high voltage causes the flash tube to break down or ignite and the main capacitor 45 to therefore discharge through the flash tube 55, the main electrodes of this flash tube being connected to the terminals of the main capacitor by means of the conductors 56 and 57.

Figure 2:
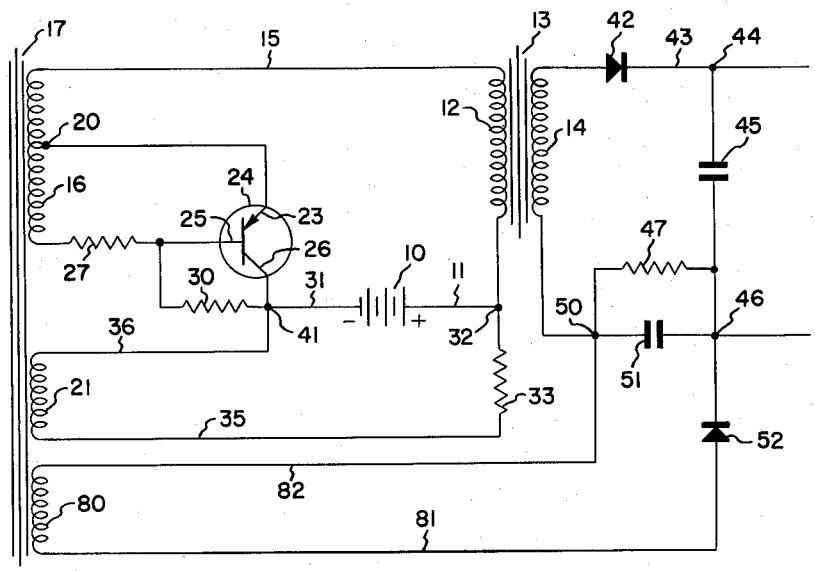
FIGURES 2 and 3 are modifications of FIGURE 1.

Operation of FIGURE 2

The circuit of FIGURE 2 is in many respects identical with the disclosure of FIGURE 1, and like components in the two figures are identified by like numerals. In FIGURE 2, the saturating transformer 17 has in addition to the windings 16 and 21 an additional winding 80. The lower extremity of the winding 80 is connected by a conductor 81 and the rectifying diode 52 to the junction 46 and one plate of the capacitor 51. The upper extremity of the winding 80 is connected by a conductor 82 to the junction 50 and the other plate of the capacitor 51. One terminal of the winding 21 is directly connected by the conductor 36 to the negative terminal of source 10 and the other extremity of the winding is connected by the conductor 35 and the resistor 33 to the positive terminal of the source.

The circuit of FIGURE 2 operates in a similar manner to that described above for FIGURE 1, except that by utilizing separate windings for the reset and the voltage clipping it becomes possible to obtain complete isolation of the primary circuit from the secondary circuit from a D.C. standpoint.

In considering the operation of the circuit in FIGURE 2, it will be noted that the converter circuit is substantially identical with that disclosed and described for FIGURE 1 and operates in the same manner during the portion of the cycle in which the transistor 24 is conductive and power is being supplied into the main capacitor 45. The action of the reset and limiting circuit operates in a slightly different manner however. A brief consideration of the circuit of FIGURE 2 discloses that, as previously, a D.C. current path exists from the positive terminal of the source 10 through the current limiting resistor 33 and the winding 21 of saturable transformer 17 to the negative terminal of the source. This circuit provides for the resetting of the core during the off half cycle of oscillator operation.

The voltage clipping circuit of FIGURE 2 operates in the following manner. During the initial portion of the charging period for the main capacitor 45, when the charging current is relatively high, the voltage appearing across the capacitor 51 will be relatively high as described above for FIGURE 1. The reset current flowing in reset winding 21 induces a voltage in the winding 80, however, during this initial period the voltage on capacitor 51 is larger than the voltage induced on winding 80 and the blocking diode 52 remains back biased and no current flows in the circuit. Under these conditions, the limiting circuit acts as an infinite impedance and no limiting is effected. As capacitor 45 becomes charged and the charging current decreases to the point that the voltage appearing on capacitor 51 becomes less than the voltage induced on winding 80, a current is caused to flow from the winding 80 through the diode 52, the capacitor 51 and back to the other terminal of the winding. This circuit acts as a low impedance shunt on the winding 80. This low impedance is reflected into winding 21 to load down the winding and maintain the voltage on reset winding 21 at a magnitude which is a function of the charge on the main capacitor. Thus the reset potential is obtained from the source 10 but is controlled through the clipping circuit by the relative potential charge on the main capacitor 45.

Figure 3:
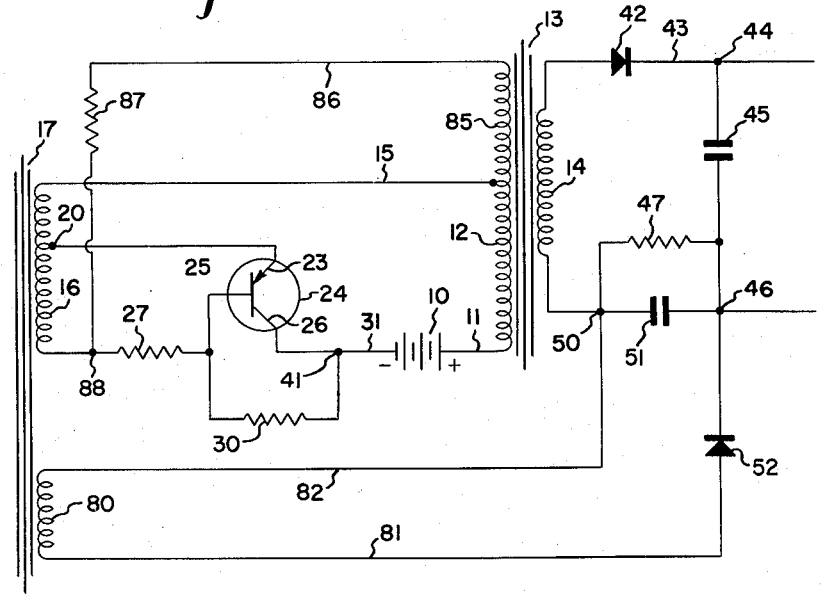

Operation of FIGURE 3

FIGURE 3 is a modification of the circuit of FIGURES 1 and 2 and like components are identified with like identifying numerals. The discussion following will be limited to the modified facts of FIGURE 3, and reference may be had to the discussion of FIGURE 1 and FIGURE 2 for further details.

The output transformer 14, as disclosed in FIGURE 3, has an additional winding 85 which has one extremity connected to the upper extremity of primary winding 12, and the other extremity of which is connected through a conductor 86 and a resistor 87 to a junction 88 between the resistor 27 and the winding 16 of saturable transformer 17. Thus in this circuit the reset potential for the core 17 is obtained from the energy stored in transformer 13 rather than from the battery 10. The saturable transformer 17 in FIGURE 3 does not include the winding 21 in view of the modified reset action, however, the winding 80 is connected in the same manner as disclosed and described for FIGURE 2.

Following the period of conduction of transistor 24 and as the field in transformer 13 resets, a potential is induced in the winding 85 and current flows from the upper extremity of the winding through the resistor 87 and through the winding 16 of saturable transformer 17 to reset the core flux thereof. As previously described for FIGURE 2, under initial charging conditions of capacitor 45 when the charging rate is high the potential appearing across the capacitor 51 is relatively high and no cliping action of the reset voltage occurs. Subsequently, however, the induced voltage on winding 80 is limited by the cliping action of diode 52 and capacitor 51. Therefore the off time of transistor 24, or in other words the reset time of the transformer 17, is inversely proportional to the charge on the main capacitor 45. Therefore, for a low state of charge on the capacitor 45, the transistor 24 is on for a large percentage of the cycle, and as the capacitor 45 becomes nearly fully charged the transistor 24 is on for a small percentage of the cycle period.

In general, while I have shown certain specific embodiments of my invention, it is to be understood that this is for the purposes of illustration and that my invention is to be limited solely by the scope of the appended claims.

I claim:

1. Battery conserving power supply apparatus for an electronic photographic flash unit of the type converting a low voltage battery source to a high potential for energizing a high voltage load means comprising: a low voltage source of unidirectional energy; output means having input and output terminals; high voltage load means, first circuit means connecting said output terminals to said load means in energizing relation thereto;

semiconductor current controlling means having a plurality of electrodes including a control electrode and output electrodes; second circuit means including saturable impedance means connecting said source of energy, the input terminals of said output means and said semiconductor current controlling means in an oscillating type circuit for producing a pulsating type current at said output means, said oscillatory circuit having an operating cycle comprising a first portion in which said semiconductor means is conductive and a second portion for flux reset of said saturable impedance means; low voltage energized core reset means for said saturable impedance means; and adjustable voltage limiter means connected to sense the magnitude of load power demand and control the energization magnitude to said core reset means as a function thereof.

2. Battery conserving power supply apparatus for an electronic photographic flash unit of the type converting a low voltage battery source to a high potential for energizing a high voltage load means comprising: a low voltage source of unidirectional energy; output means having input and output terminals; high voltage load means, first circuit means connecting said output terminals to said load means in energizing relation thereto; semiconductor current controlling means having a control electrode and output electrodes; electronic vibrator type means comprising saturable transformer means, said source of energy, the input terminals of said output means, said semiconductor means, and core reset means connected in an oscillating type circuit for producing a pulsating type current at said output means, said oscillatory circuit having an operating cycle comprising a first portion in which said semiconductor means is conductive so that current flows from said source in said output means and said saturable transformer means until said saturable transformer means saturates and a second portion in which current flows in said core reset means for flux reset of said saturable transformer means; and adjustable voltage limiter means connected to sense the magnitude of load power demand and control the current flow to said core reset means as a function thereof.

3. Battery conserving power supply apparatus for an electronic photographic flash unit of the type converting a low voltage battery source to a high potential for energizing a high voltage load means comprising: a low voltage source of unidirectional energy; output transformer means having input and output terminals; semiconductor amplifying means having a control electrode and output electrodes; first circuit means including saturable transformer means connecting said source of energy, the input terminals of said output transformer means and said semiconductor amplifying means in an oscillating type circuit for producing a pulsating type current in said output transformer, said oscillatory circuit having an operating cycle comprising a first portion in which said semiconductor means is conductive and a second portion for flux reset of said saturable transformer means; high voltage load means; second circuit means including rectifying means connecting said output terminals to said load means in energizing relation thereto; core reset means for said saturable transformer means energized from said low voltage source; and self-adjusting voltage limiter means connected to sense the magnitude of load power demand and limit the energization to said core reset means in an inverse relation thereto.

4. In a battery conserving power supply for an electronic photographic flash unit of the type for converting a low voltage battery source to a high voltage for energizing a high voltage load, which power supply includes electronic direct current to alternating current converter means, step up transformer means and rectifier means, the improvement comprising: means connecting in a current loop low voltage battery means, output means, and electronic chopper means for periodically interrupting the current flow from said battery means through said output means; said electronic chopper means comprising a transistor having a plurality of electrodes including at least a control electrode and output electrodes, saturable impedance means having a core which saturates in normal operation, core reset means energized from said source, said chopper means having a repetitive cycle of operation including a first "on" condition of operation in which current from said source flows through said output means, said transistor and said saturable impedance means until said saturable core saturates, and a second reset condition of operation in which current flows only in said core reset means to unsaturate said transformer; and self adjusting voltage limiting means connected to said core reset means and responsive to the load power demand for adjusting the voltage limiting as a function of load power demand so that the reset time is varied as a function of load power demand.

5. In a battery conserving power supply for an electronic photographic flash unit of the type for converting a low voltage battery source to a high voltage for energizing a high voltage load, which power supply includes electronic direct current to alternating current converter means adjustable in operation as a function of load demand, step up transformer means and rectifier means, the improvement comprising: means connecting in a current loop low voltage battery means, output voltage step-up transformer means, and electronic oscillatory means for periodically interrupting the current flow through said output means; said electronic oscillatory means comprising a transistor having a plurality of electrodes including at least a control electrode and output electrodes, saturable transformer means having a core which saturates in normal operation, and energized core reset means, said oscillatory means having a repetitive cycle of operation including a first "on" condition of operation in which a relatively large current from said source flows through said output transformer means, said transistor and said saturable transformer until said saturable transformer core saturates and a second reset condition of operation in which a relatively small current flows only in said core reset means to unsaturate said transformer; and self adjusting voltage limiting means connected to said core reset means and responsive to the load power demand for adjusting the voltage limiting as a function of such demand in a manner that the reset time is increased as the demand decreases so that when the demand decreases the ratio of reset time to on time is greatly increased and average battery drain is substantially reduced.

6. Battery conserving power supply apparatus of the type converting a low voltage battery source to a high potential for supplying a high voltage variable load comprising: a low voltage source of unidirectional energy; output transformer means having input and output terminals; high voltage load means, first circuit means connecting said transformer output terminals in energizing relation to said load means; semiconductor current control means having a control electrode and output electrodes; electronic inverter type means comprising inductive winding means having a saturable core, said source of energy, the input terminals of said transformer means, said semiconductor current control means, output electrodes connected in a series circuit, and comprising further winding means energized from said low voltage source and connected to reset the flux in said saturable core to provide an oscillating type circuit for producing a pulsating type current at said transformer means, said oscillatory circuit having an operating cycle comprising a first portion in which said semiconductor means is biased to conduction until said inductive means saturates and a second portion for flux reset of said saturable impedance means; and self adjusting voltage limiter means connected to sense the magnitude of load power demand and control the current flow in said core reset means as a function thereof.

7. Battery conserving power supply apparatus of the type converting a low voltage battery source to a high potential for energizing a high voltage load means comprising: a low voltage source of unidirectional energy; transducer means having input and output terminals; semiconductor amplifying means having a control electrode and output electrodes; first circuit means including saturable transformer means connecting said source of energy, the input terminals of said transducer means and said semiconductor amplifying means in an oscillating type circuit for producing a pulsating type current in said transducer means, said oscillatory circuit having an operating cycle comprising a first portion in which said semiconductor means is conductive and a second portion for flux reset of said saturable transformer means; high voltage load means, second circuit means including rectifying means connecting said output terminals to said load means so that the output of said transducer means energizes said load means; energized core reset means for said saturable transformer means; and self adjusting voltage limiter means connected to sense the magnitude of load power demand and modify the energization to said core reset means as a function thereof.

8. Battery conserving power supply apparatus of the type converting a low voltage battery source to a high potential for energizing a high voltage load means comprising: a low voltage source of unidirectional energy; transducer means having input and output terminals; semiconductor amplifying means having a control electrode and output electrodes; first circuit means including saturable transformer means connecting said source of energy, the input terminals of said transducer means and said semiconductor amplifying means in an oscillating type circuit for producing a pulsating type current in said transducer means, said oscillatory circuit having an operating cycle comprising a first portion in which said semiconductor means is conductive and a second portion for flux reset of said saturable transformer means; high voltage load means, second circuit means including rectifying means connecting said output terminals to said load means so that the output of said transducer means energizes said load means; energized core reset means for said saturable transformer means; and self adjusting voltage limiter means connected to sense the magnitude of load power demand and modify the energization to said core reset means as a function thereof.

9. Battery conserving power converting and storage apparatus comprising: low voltage battery means; output means having a plurality of input terminals and output terminals; load means to be energized connected in circuit with said output terminals; semiconductor oscillator voltage inverter means comprising a semiconductor current controlling device having control and output terminals, saturable impedance means having a saturable core, electrical network means connecting said semiconductor output terminals, said impedance means and output means input terminals in a current loop to said battery means, means connecting a portion of said impedance means in a current feedback loop to said control terminals, and energized core reset means connected to said saturable impedance means; said semiconductor oscillator voltage inverter means having a repetitive cycle of operation including a first "on" portion in which said semiconductor current controlling device is rendered conductive so that a relatively large current flows in said output means and upon saturation of said saturable impedance means a further reset portion for flux reset of said saturable impedance means in which a relatively small current flows only in said core reset means; and adjustable voltage clipper means connected to sense the magnitude of load power demand and modify the energization to said core reset means as a function thereof, so that the reset time is increased with respect to the on time whereupon the battery drain is substantially reduced as said load power demand decreases.

10. Battery conserving power converting and storage apparatus comprising: low voltage D.C. source means; output means including voltage step-up having a plurality of input terminals and output terminals; electrical energy storage means connected in circuit with said output terminals; semiconductor oscillator voltage inverter means comprising a semiconductor current controlling device having control and output terminals, saturable inductive means having a saturable core, electrical network means connecting said semiconductor output terminals, said saturable inductive means and said output means input terminals in a current loop to said battery means, means connecting a portion of said inductive means in a current feedback loop to said semiconductor control terminal, and energized core reset means connected to said saturable inductive means; said semiconductor oscillator voltage inverter means having a repetitive cycle of operation including a first "on" condition in which said semiconductor current controlling device is rendered conductive so that a relatively large current flows in said output means and upon saturation of said saturable impedance means a further condition for flux reset of said saturable impedance means in which a relatively small current flows only in the core reset means circuit; and adjustable voltage clipper means connected to sense the magnitude of power demand of said storage means and adjust the energization to said core reset means as a function of said demand.

11. Battery conserving power converting and storage apparatus comprising: low voltage battery means; output transformer voltage step-up means having a plurality of input terminals and output terminals; electrical energy storage load means connected in circuit with said output terminals; semiconductor oscillator voltage inverter means comprising a single semiconductor current controlling device having control and output terminals, saturable transformer means having a saturable core, electrical network means connecting said semiconductor output terminals, said saturable transformer means and said output transformer means input terminals in a current loop to said battery means, means connecting a portion of said saturable transformer means in a current feedback loop to said control terminals, and energized core reset means connected to said saturable transformer means; said semiconductor oscillator voltage inverter means having a repetitive cycle of operation including a first "on" condition in which said semiconductor current controlling device is rendered conductive so that a relatively large current flows in said output transformer means and upon saturation of said saturable transformer means a further condition for flux reset of said saturable transformer means in which a relatively small current flows only in said core reset circuit; and adjustable voltage clipper means connected to sense the magnitude of load demand of said storage means and reduce the magnitude of energization to said core reset means as said demand decreases so that the low current reset time is increased with respect to the on time with the result that average battery drain is substantially decreased.

12. Battery conserving power supply apparatus of the type converting a low voltage source to a high potential for supplying a high voltage variable load comprising: a low voltage source of unidirectional energy; output means comprising step-up transformer means, having input and output terminals; high voltage variable load means energized from said output terminals; semiconductor current control means having a control electrode and output electrodes; saturable transformer means having a plurality of windings including primary and reset windings; oscillating circuit means comprising a first portion including a primary winding of said saturable impedance means, said source of energy, the input terminals of said output transformer means, and the output electrodes of said semiconductor current control means in a series circuit, and comprising a second core reset portion including resistance means connecting said low voltage source to said reset winding, said oscillatory circuit having an operating cycle comprising a first portion in which said semiconductor means is conducting and a second portion for flux reset of said saturable transformer means; and self-adjusting voltage limiter means connected to sense the magnitude of load current demand and control the voltage on said core reset winding as a function thereof.

References Cited in the file of this patent

UNITED STATES PATENTS

| | | |
|---|---|---|
| 2,748,274 | Pearlman | May 29, 1956 |
| 2,852,730 | Magnuski | Sept. 16, 1958 |
| 2,873,409 | Most | Feb. 10, 1959 |
| 2,877,385 | Rock | Mar. 10, 1959 |